(12) United States Patent
Chung

(10) Patent No.: US 11,057,379 B2
(45) Date of Patent: Jul. 6, 2021

(54) ELECTRONIC DEVICE PERFORMING AUTHENTICATION ON ANOTHER ELECTRONIC DEVICE AND METHOD FOR OPERATING THE SAME

(71) Applicant: SAMSUNG ELECTRONICS CO., LTD., Suwon-si (KR)

(72) Inventor: Sanghun Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 16/253,997

(22) Filed: Jan. 22, 2019

(65) Prior Publication Data

US 2019/0230079 A1 Jul. 25, 2019

(30) Foreign Application Priority Data

Jan. 22, 2018 (KR) .................. 10-2018-0007977

(51) Int. Cl.
*H04L 29/06* (2006.01)
*H04W 12/06* (2021.01)

(52) U.S. Cl.
CPC ...... *H04L 63/0884* (2013.01); *H04L 63/0853* (2013.01); *H04L 63/0861* (2013.01); *H04L 63/18* (2013.01); *H04W 12/06* (2013.01)

(58) Field of Classification Search
CPC ............. H04L 63/0884; H04L 63/0853; H04L 63/0861; H04L 63/18; H04W 12/06
USPC ........................................................... 726/7
See application file for complete search history.

(56) References Cited

U.S. PATENT DOCUMENTS

| 9,009,230 | B1 | 4/2015 | Matthieu et al. |
| 9,210,192 | B1 | 12/2015 | Kim et al. |
| 10,440,122 | B2* | 10/2019 | Brickell .......... H04L 67/12 |
| 2013/0225166 | A1 | 8/2013 | Akhtar et al. |
| 2015/0229713 | A1 | 8/2015 | Lu et al. |
| 2015/0236777 | A1 | 8/2015 | Akhtar et al. |
| 2015/0249642 | A1 | 9/2015 | Burns et al. |

(Continued)

OTHER PUBLICATIONS

Neto et al., "Demo Abstract: Attributed-based Authentication and Access Control for IoT Home Devices", IEEE, doi: 10.1109/IPSN. 2018.00019, 2018, pp. 112-113. (Year: 2018).*

(Continued)

*Primary Examiner* — Peter C Shaw
(74) *Attorney, Agent, or Firm* — Sughrue Mion, PLLC

(57) ABSTRACT

A first electronic device includes a touchscreen and a processor which transmits first information related to the first electronic device or a user account of the first electronic device through a first communication network to authenticate a second electronic device. The processor further obtains second information to authenticate the second electronic device transmitted from the first server based on the first information through a second communication network. An authentication request includes the first information and is transmitted from the second electronic device to a first server which supports an authentication function. A first screen is displayed on the touchscreen for receiving a first input related to the second information. Authentication information is received through the touchscreen based on the received first input, and the authentication information is transmitted to the first server to authenticate the second electronic device.

17 Claims, 9 Drawing Sheets

(56) References Cited

U.S. PATENT DOCUMENTS

| | | |
|---|---|---|
| 2015/0249672 A1 | 9/2015 | Burns et al. |
| 2015/0304848 A1 | 10/2015 | Kim et al. |
| 2016/0036819 A1 | 2/2016 | Zehavi et al. |
| 2016/0044032 A1 | 2/2016 | Kim et al. |
| 2016/0081133 A1 | 3/2016 | Kim et al. |
| 2016/0088478 A1 | 3/2016 | Kim et al. |
| 2016/0132516 A1 | 5/2016 | Greenberg et al. |
| 2016/0253533 A1 | 9/2016 | Bhargava et al. |
| 2016/0259932 A1 | 9/2016 | Lakshmanan et al. |
| 2016/0267408 A1 | 9/2016 | Singh et al. |
| 2016/0330613 A1 | 11/2016 | Cook et al. |
| 2016/0381030 A1 | 12/2016 | Chillappa et al. |
| 2017/0048060 A1 | 2/2017 | Zuerner |
| 2017/0153681 A1 | 6/2017 | Chin et al. |
| 2017/0201385 A1 | 7/2017 | Kravitz et al. |
| 2017/0364875 A1* | 12/2017 | Efroni ................ G06Q 20/3829 |
| 2018/0121921 A1* | 5/2018 | Woo ........................ H04W 4/80 |
| 2020/0169549 A1* | 5/2020 | Smith .................... H04W 12/06 |
| 2020/0259654 A1* | 8/2020 | Barnes .................. H04W 12/06 |

OTHER PUBLICATIONS

Togan et al., "A smart-phone based privacy-preserving security framework for IoT devices", IEEE, doi: 10.1109/ECAI.2017.8166453, 2017, pp. 1-7. (Year: 2017).*

Anonymous, "OAuth 2.0 for TV and Limited-Input Device Applications", Apr. 17, 2017, (17 pages total).

* cited by examiner

ELECTRONIC DEVICE PERFORMING AUTHENTICATION ON ANOTHER ELECTRONIC DEVICE AND METHOD FOR OPERATING THE SAME

CROSS-REFERENCE TO RELATED APPLICATION

This application is based on and claims priority under 35 U.S.C. § 119 to Korean Patent Application No. 10-2018-0007977, filed on Jan. 22, 2018, in the Korean Intellectual Property Office, the disclosure of which is incorporated by reference herein in its entirety.

BACKGROUND

1. Field

The disclosure relates to an electronic device to perform authentication on another electronic device and a method for operating the same.

2. Description of Related Art

As wireless communication technology advances, Internet of things (IoT) devices are under vigorous development.

An IoT device may connect to a cloud server to perform functions. The user of an IoT device may register the IoT device in a cloud server by authentication. When the IoT device is registered in the cloud server, the IoT device may perform various functions through the cloud server. In wide use for registering an IoT device in a cloud server is open authorization (Outh)-based authentication.

Outh-based authentication requires the electronic device to be equipped with a display and/or an input device. In other words, the electronic device to perform Outh-based authentication may perform authentication through its equipped display and/or input device. Specifically, the user may identify information displayed on the display and enter its corresponding information through the input device. The electronic device may send the entered information to the cloud server, performing authentication.

Meanwhile, no-display, no-input device electronic devices are coming on the market. Where an IoT device lacks a display or an input device, the user might not identify or enter information, with the result of difficulty in performing Outh-based authentication. For example, a conventional way for Outh-based authentication on an IoT device with a display but no input device is to display a uniform resource locator (URL) and user code on the display of the IoT device. However, display-less IoT devices cannot display an URL and user code nor can they carry out Outh-based authentication accordingly.

The above information is presented as background information only to assist with an understanding of the present disclosure. No determination has been made, and no assertion is made, as to whether any of the above might be applicable as prior art with regard to the present disclosure.

SUMMARY

According to an aspect of the disclosure, there are provided an electronic device to perform Outh-based authentication on an IoT device with no display and input device and a method of operating the electronic device.

According to an aspect of the disclosure, a first electronic device comprises a touchscreen and a processor configured to transmit first information related to the first electronic device or a user account of the first electronic device through a first communication network to authenticate a second electronic device, when the second electronic device transmits an authentication request including the first information to a first server configured to support an authentication function, obtain second information to authenticate the second electronic device transmitted from the first server based on the first information through a second communication network, display a first screen for the second information on the touchscreen to receive a first input related to the second information, receive authentication information through the touchscreen when the first input is received through the first screen, and transmit the authentication information to the first server to authenticate the second electronic device.

According to an aspect of the disclosure, a method of operating a first electronic device includes transmitting first information related to the first electronic device or related to a user account of the first electronic device through a first communication network to authenticate a second electronic device, when the second electronic device transmits an authentication request including the first information to a first server configured to support an authentication function, obtaining second information to authenticate the second electronic device transmitted from the first server based on the first information through a second communication network, displaying a first screen for the second information on a touchscreen of the first electronic device to receive a first input related to the second information, receiving authentication information through the touchscreen when the first input is received through the first screen, and transmitting the authentication information to the first server to authenticate the second electronic device.

According to an aspect of the disclosure, a first electronic device includes a touchscreen and a processor configured to, upon receiving an authentication request from a second electronic device through a first communication network, display a first screen to receive authentication information on the touchscreen, receive the authentication information through the first screen through a second communication network, transmit the received authentication information to a first server configured to support authentication on the second electronic device, receive an authentication code from the first server, and transmit the received authentication code to the second electronic device.

Additional aspects will be set forth in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, wherein.

DETAILED DESCRIPTION

Figure 1:
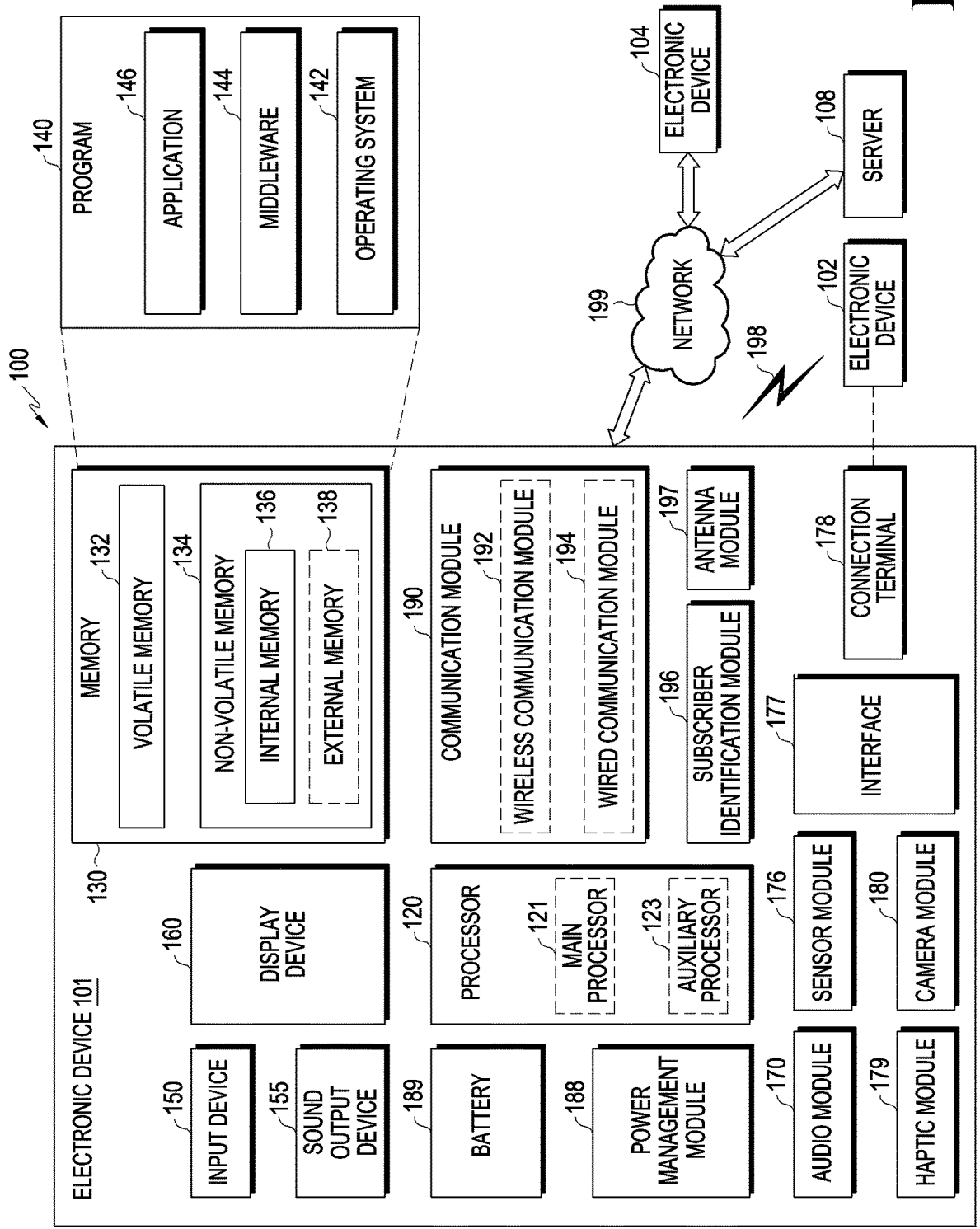
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101).

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
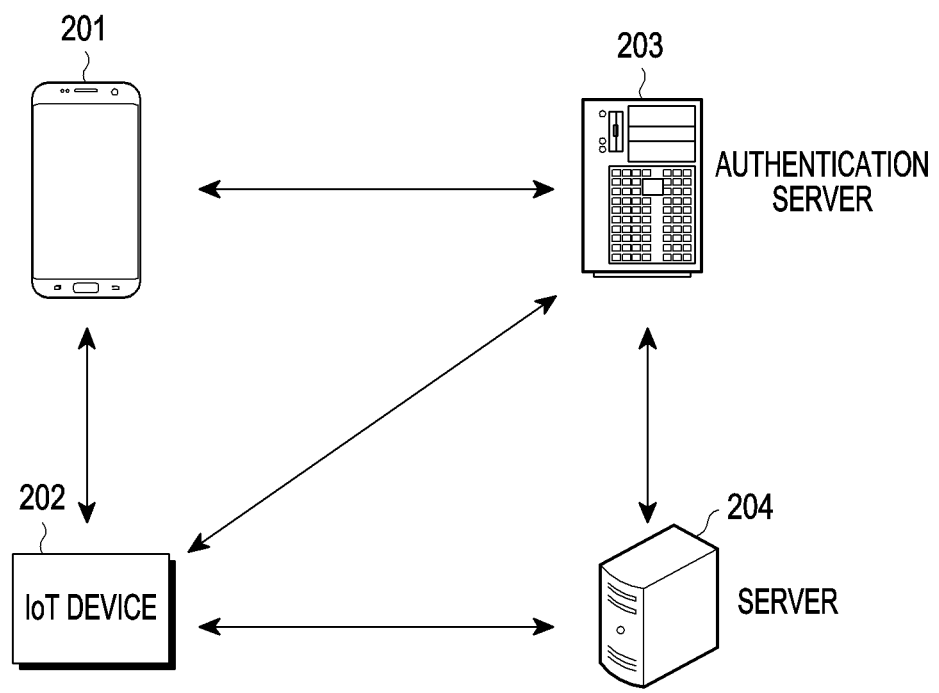
FIG. 2 is a block diagram illustrating an electronic system in which a first electronic device communicates with a second electronic device and an authentication server according to an embodiment.

FIG. 2 is a block diagram illustrating an electronic system in which a first electronic device communicates with a second electronic device and an authentication server according to an embodiment.

Referring to FIG. 2, an electronic system may include a first electronic device 201, a second electronic device 202, an authentication server 203, and a server 204.

The first electronic device 201 may be implemented in substantially the same or similar manner to the electronic device 101 described above in connection with FIG. 1. For example, the first electronic device 201 may be implemented as a terminal with an input device (e.g., the input device 150 of FIG. 1) and a display (e.g., the display device 160 of FIG. 1). For example, the first electronic device 201 may include a touchscreen capable of both input and display functionality.

The first electronic device 201 may include a communication module (e.g., the communication module 190 of FIG. 1) to communicate with the second electronic device 202 and the authentication server 203. For example, the first electronic device 201 may transmit or receive data to/from the second electronic device 202 and/or the authentication server 203 through wireless-fidelity (Wi-Fi) communication provided by the communication module 190.

According to an embodiment, the first electronic device 201 may perform (or support) authentication on the second electronic device 202. The first electronic device 201 may transmit or receive data to/from the authentication server 203 to perform (or support) authentication on the second electronic device 202. For example, the first electronic device 201 may perform a browsing function through the input device 150 and the display 160 for authentication of the second electronic device 202. The first electronic device 201 may perform (or support) authentication on the second electronic device 202 through the browsing function.

The second electronic device 202 may be implemented in substantially the same or similar manner to the electronic device 102 described above in connection with FIG. 1. For example, the second electronic device 202 may be implemented as an IoT device or electronic device with no input device and display. Or, the second electronic device 202 may be implemented as an IoT device with its input and display functionality limited.

The second electronic device 202 may include a communication module to communicate with the authentication server 203 and/or the server 204. For example, the second electronic device 202 may transmit or receive data to/from the first electronic device 201, the authentication server 203, and/or the server 204 through Wi-Fi communication provided by the communication module. The first electronic device 201 and the second electronic device 202 may also perform communication based on other short-range communication schemes (e.g., Bluetooth communication) than Wi-Fi communication.

According to an embodiment, the second electronic device 202 may be a device under authentication. For example, the second electronic device 202 may perform authentication to access the server 204. The second electronic device 202 may perform authentication to register the second electronic device 202 in the server 204. In this case, the second electronic device 202 may directly access the server 204, performing authentication. Or, the second electronic device 202 may perform authentication through the authentication server 203 that supports authentication functionality. In other words, the second electronic device 202 may perform the authentication that the second electronic device 202 is a device identifiable by the server 204 or a device related to a user identifiable by the server 204.

The authentication server 203 may support an authentication operation or a function on the second electronic device 202 using open authorization (Outh). For example, the authentication server 203 may be a server supporting Outh functionality. For example, where the authentication is complete by the authentication server 203, the authentication server 203 may transmit data indicating an authority for the device to access the server 204 as authenticated. The authentication server 203 may store the data regarding the access authority.

The server 204 may permit access to the authenticated second electronic device 202. For example, the server 204 may permit the second electronic device 202, which has been authenticated by the authentication server 203, to gain access. The server 204 may provide resources for the functionality of the second electronic device 202. For example, the server 204 may be a resource server supporting the operation or functionality of the IoT device.

Figure 3:
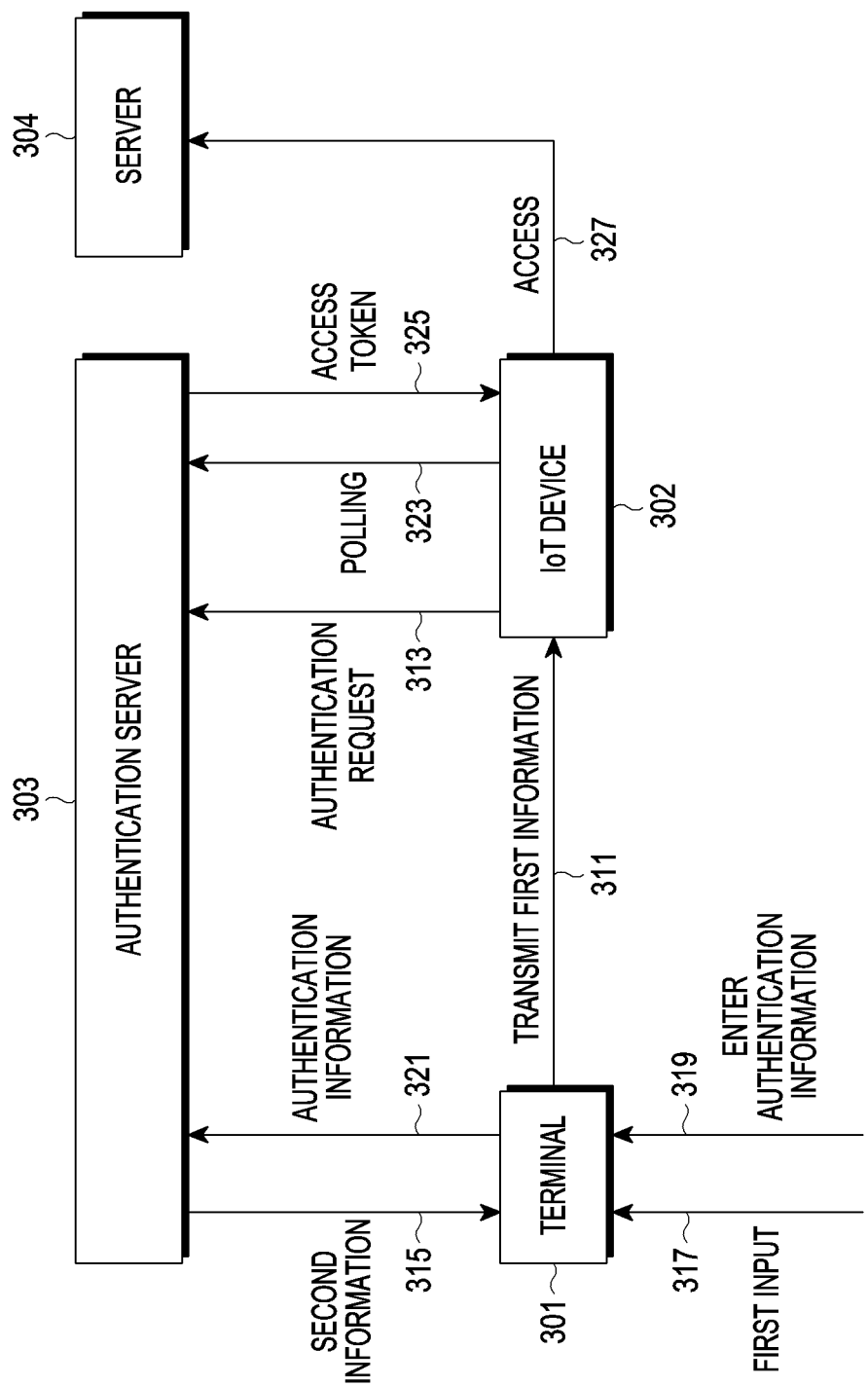
FIG. 3 is a block diagram illustrating an operation of a first electronic device performing authentication of a second electronic device according to an embodiment.

FIG. 3 is a block diagram illustrating the operation of a first electronic device performing authentication of a second electronic device according to an embodiment.

Referring to FIG. 3, the electronic system may be implemented to be substantially the same as the electronic system described above in connection with FIG. 2. For example, a terminal 301 may be implemented to be substantially the same as the first electronic device 201 of FIG. 2, and an IoT device 302 may be implemented to be substantially the same as the second electronic device 202 of FIG. 2. An authentication server 303 and a server 304 may be implemented to be substantially the same as the authentication server 203 and the server 204 of FIG. 2.

Upon powering on, the IoT device 302 may operate as an access point (AP) during a predetermined time. For example, the IoT device 302 may operate as a Wi-Fi AP (e.g., in a soft AP mode) during a predetermined time. The IoT device 302 may be in an initialized state before powering on.

When the IoT device 302 powers on, the terminal 301 may access the IoT device 302 via a communication module (e.g., the communication module 190 of FIG. 1). For example, the terminal 301 may search for a Wi-Fi AP and access the IoT device 302. In this case, the terminal 301 and the IoT device 302 may form a first communication network using Wi-Fi communication.

When the terminal 301 accesses the IoT device 302, the terminal 301 may transmit first information to the IoT device 302 (in operation 311). In other words, the terminal 301 may transmit the first information to the IoT device 302 through the first communication network. For example, the first information may include account information of the user of the terminal 301 and/or information related to the terminal 301. For example, the first information may include the user's email address and/or the phone number of the terminal 301. In other words, the account information may be the email address, and the information related to the terminal 301 may be the phone number. The first information may also include information about the Wi-Fi AP. The Wi-Fi AP may mean information about the Wi-Fi AP stored in the terminal 301.

The IoT device 302 may access the Wi-Fi AP using AP information contained in the first information. At this time, the first communication network established between the terminal 301 and the IoT device 302 may be released.

The IoT device 302 may send a request for authentication to the authentication server 303 through the accessed Wi-Fi AP (in operation 313). The IoT device 302 may transmit the account information or the information (e.g., phone number) related to the terminal 301 included in the first information, along with the authentication request, to the authentication server 303.

According to an embodiment, the terminal 301 may obtain second information transmitted from the authentication server 303 using the first information. For example, after the first communication network is released, the terminal 301 may form a second communication network with the authentication server 303. The authentication server 303 may identify the terminal 301 using the first information and transmit the second information to the identified terminal 301. For example, the authentication server 303 may transmit the second information to the terminal 301 using the email account included in the first information. Or, the authentication server 303 may transmit the second information to the terminal 301 using the phone number contained in the first information.

The terminal 301 may receive the second information through the second communication network. For example, the terminal 301 may access the email account contained in the first information, receiving the second information. Or, the terminal 301 may receive the second information through a text message received at the phone number contained in the first information. For example, the second information may mean information for authenticating the IoT device 302. The second information may include URL information indicating a designated URL for authenticating the IoT device and a user code required to enter upon accessing the designated URL.

According to an embodiment, the authentication server 303 may transmit the second information through the user account (e.g., email address) or the information (e.g., phone number) related to the terminal 301 contained in the first information. For example, the authentication server 303 may transmit the second information (e.g., URL address and user code) at the email address contained in the first information. Or, the authentication server 303 may transmit a text message containing the second information (e.g., URL address and user code) at the phone number contained in the first information.

According to an embodiment, the terminal 301 may receive a first input for the second information from the user (in operation 317). For example, the terminal 301 may display the second information (e.g., URL address and user code) on the display (e.g., the display device 160 of FIG. 1). The terminal 301 may display a first screen for entering (or receiving) the second information on the display 160. For example, the first screen may include information about the URL address and the user code. The terminal 301 may enter the URL address as per the user's first input to the first screen, accessing the URL address. Upon accessing the URL address, the terminal 301 may receive the user code from the user as per the user's first input. In other words, the first input may include the user's entry for accessing the URL address and entry of the user code through the touchscreen. Even where the IoT device 302 lacks a display means and an input means, the authentication server 303 may enter the user code at the URL address using the terminal 301.

Upon accessing the URL address contained in the second information and receiving the user code contained in the second information, the terminal 301 may display a second surface for entering authentication information. For example, the terminal 301 may receive the user's login information (e.g., ID and password), as authentication information, through the second screen (in operation 319).

Upon receiving the authentication information, the terminal 301 may transmit the authentication information to the authentication server 303 (in operation 321). For example, the terminal 301 may transmit the authentication information through the second communication network to the authentication server 303. Even where the IoT device 302 lacks a display and an input interface, the authentication server 303 may receive the authentication information using the terminal 301.

The authentication server 303 may receive the authentication information through the second communication network. The authentication server 303 may determine whether the received authentication information matches any one of a plurality of pieces of authentication information stored in the authentication server 303. When the received authentication information matches any one of the plurality of pieces of authentication information stored in the authentication server 303, the authentication server 303 may determine that the authentication is complete (or succeeds). By contrast, unless the received authentication information matches any one of the plurality of pieces of authentication information stored in the authentication server 303, the authentication server 303 may determine that the authentication fails.

To identify whether the authentication is complete by the authentication server 303, the IoT device 302 may transmit a polling message to the authentication server 303 (323). The IoT device 302 may periodically transmit polling messages to the authentication server 303, identifying whether the authentication is complete.

When the authentication is complete, the authentication server 303 may transmit an access token to the IoT device 302 (in operation 325). The access token may mean data indicating an authority to allow the IoT device 302 complete for authentication to access the server 304. Where the authentication fails, the authentication server 303 may transmit a message indicating that the authentication fails to the IoT device 302. At this time, the IoT device 302 may obtain the access token.

The IoT device 302 may access the server 304 using the access token (in operation 327). Further, the IoT device 302 may be registered in the server 304 using the access token.

Figure 4:
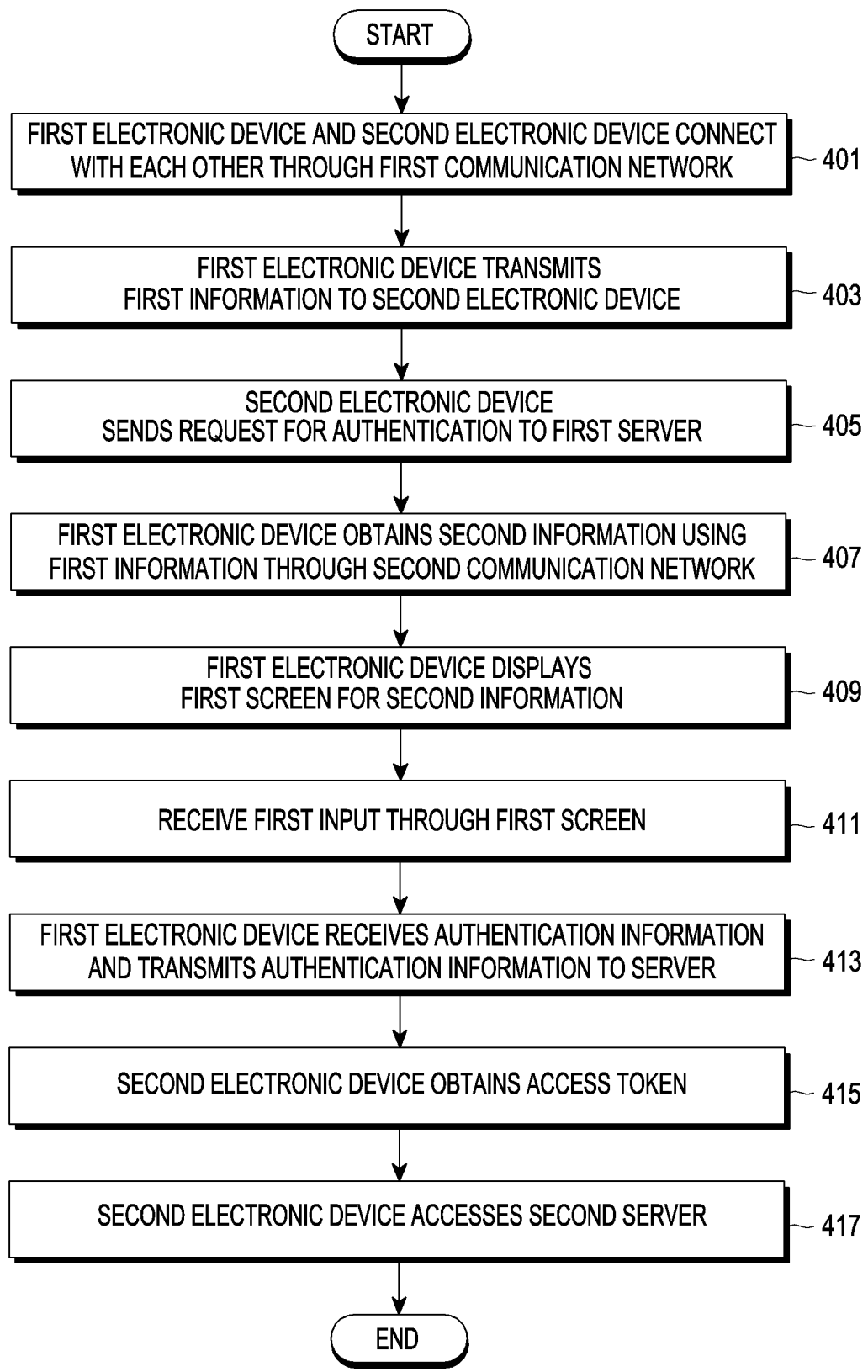
FIG. 4 is a flowchart illustrating operations of a first electronic device according to an embodiment.

FIG. 4 is a flowchart illustrating operations of a first electronic device according to an embodiment.

Referring to FIG. 4, a first electronic device (e.g., the first electronic device 201 of FIG. 2) may connect with a second electronic device (e.g., the second electronic device 202 of FIG. 2) through a first communication network (in operation 401). For example, when the second electronic device 202 powers on, the second electronic device 202 may operate as an AP during a predetermined time. At this time, the first electronic device 201 may access the second electronic device 202 which operates as an AP. At this time, the first communication network may be established between the first electronic device 201 and the second electronic device 202.

The first electronic device 201 may transmit first information to the second electronic device 202 through the first communication network (in operation 403). For example, the first information may contain an email address (or email account) of the user of the first electronic device or a phone number of the first electronic device. The first information may contain information about a Wi-Fi AP stored in the first electronic device 201.

The second electronic device 202 may send a request for authentication to a first server (e.g., the authentication server 203 of FIG. 2) (in operation 405). The second electronic device 202 may release the first communication network accessing the first electronic device 201 and send a request for authentication to the first server 203. At this time, the second electronic device 202 may send a request for authentication to the first server 203 through an accessible AP using the Wi-Fi AP information contained in the first information.

The first electronic device 201 may obtain second information (e.g., a designated URL address and user code) using the first information through a second communication network (in operation 407). For example, the first electronic device 201 may access the email address (or email account) contained in the first information through the second communication network, obtaining the second information. The first electronic device 201 may obtain the second information through a text message transmitted at the phone number contained in the first information.

The first electronic device 201 may display a first screen for the second information on a touchscreen (e.g., the display device 160 of FIG. 1) (in operation 409). For example, the first electronic device 201 may display the first screen including the designated URL address and the user code. The first screen may include a message indicating entry of the user code as displayed by accessing the designated URL address.

The first electronic device 201 may receive a first input through the first screen (in operation 411). For example, the first electronic device 201 may access the designated URL address as per the first input for accessing the designated URL address, with the first screen displayed. Further, the electronic device 201 may receive, or receive entry of, the user code as per the first input at the designated URL address designated.

When the entry of the user code is complete, the first electronic device 201 may receive authentication information (in operation 413). Further, the first electronic device 201 may transmit the received authentication information to the first server 203. For example, the authentication information may contain information about the ID and password of the user (e.g., the user of the first electronic device 201) registered in the first server 203.

When the first electronic device 201 transmits the authentication information to the first server to authenticate the second electronic device 202, the second electronic device 202 may obtain an access token (in operation 415). For example, the second electronic device 202 may transmit a failing message to identify that the authentication is complete to the first server 203, obtaining the access token from the first server 203.

The second electronic device 202 may access a second server (e.g., the server 204 of FIG. 2) using the access token (in operation 417). Further, the second electronic device 202 may be registered in the second server 204 using the access token.

Figure 5A:
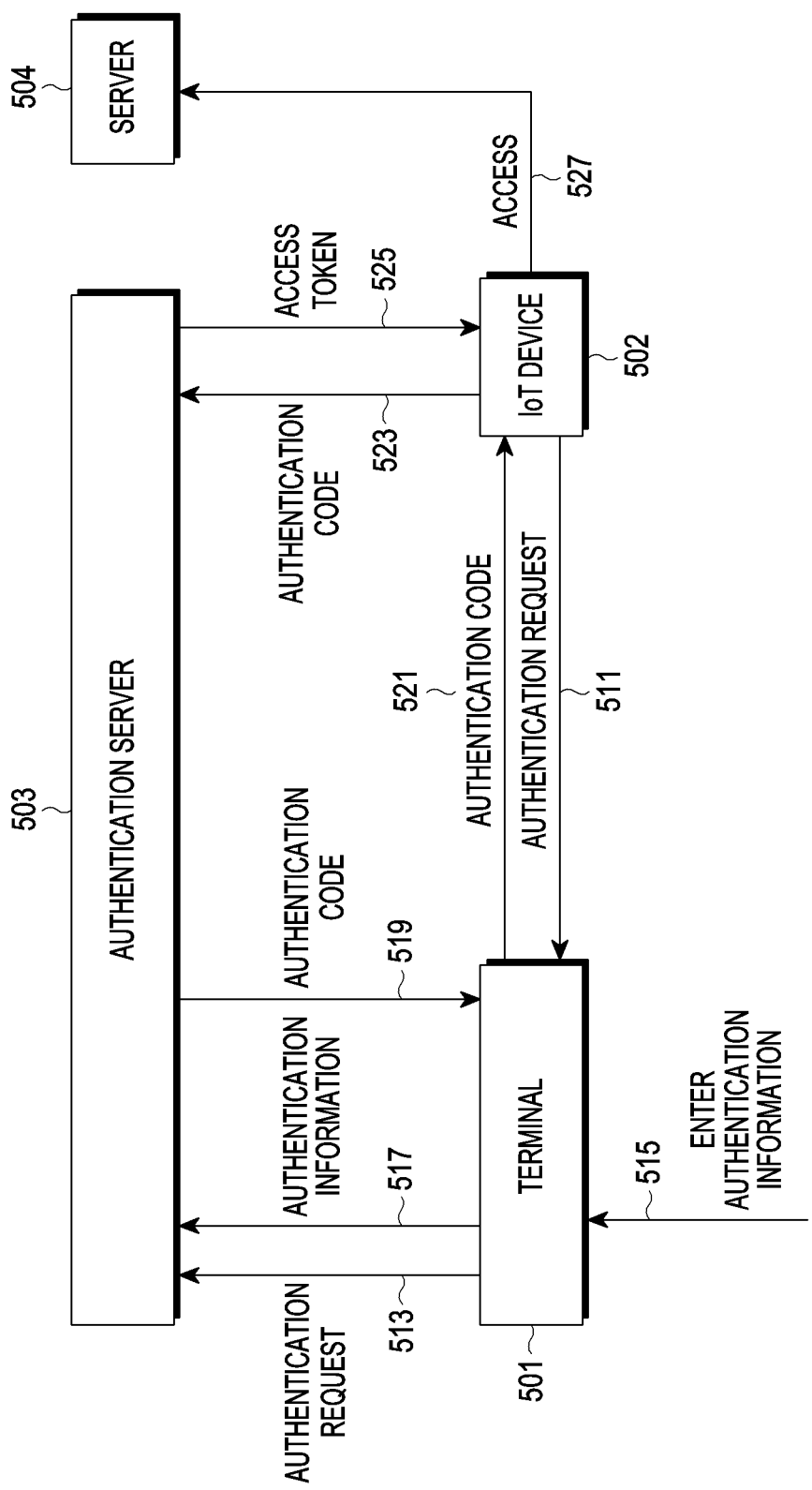
FIGS. 5A and 5B are block diagrams illustrating an operation of a first electronic device performing authentication of a second electronic device according to an embodiment.
Figure 5B:
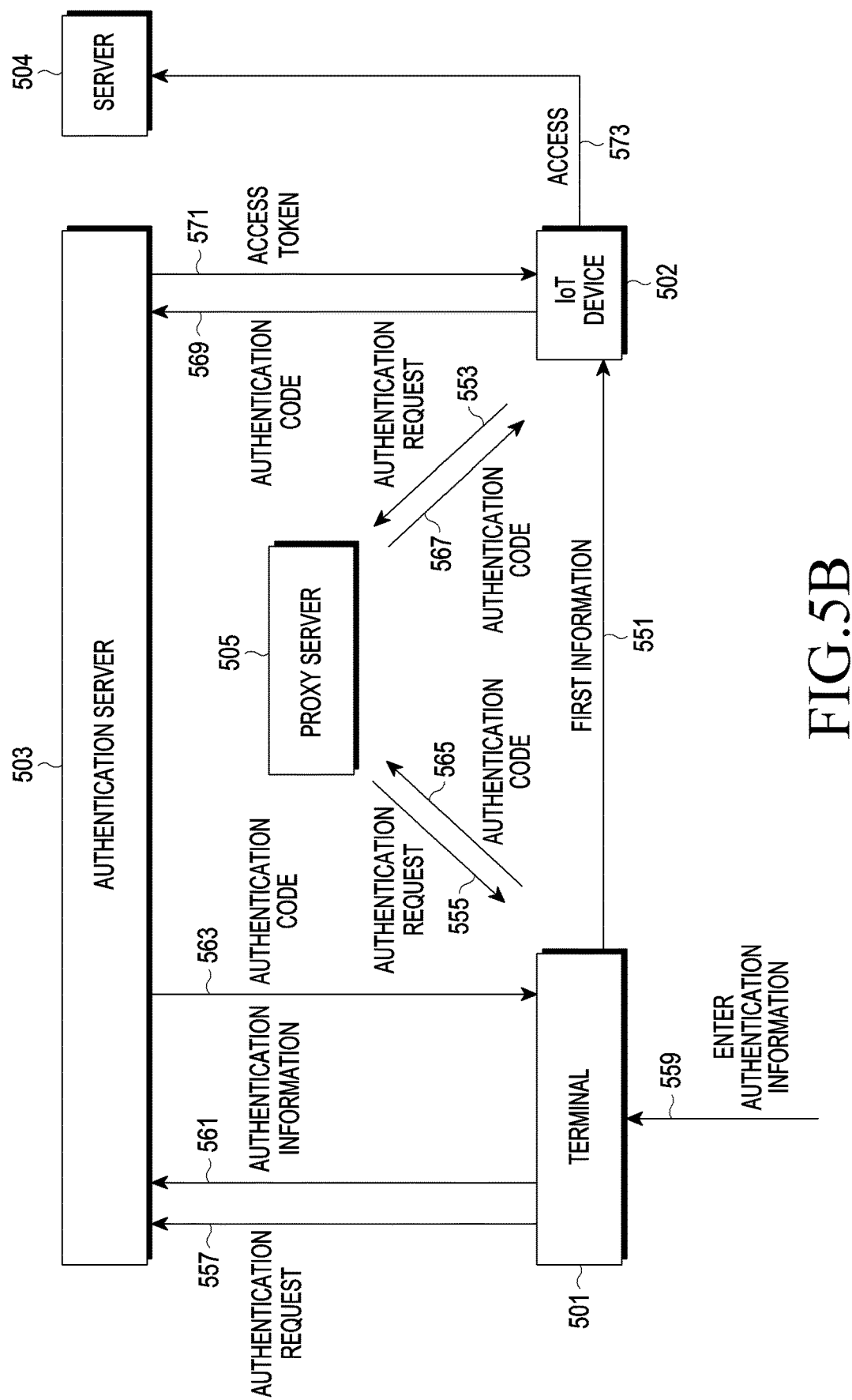

FIGS. 5A and 5B are block diagrams illustrating an operation of a first electronic device performing authentication of a second electronic device according to an embodiment.

Referring to FIG. 5A, the electronic system may be implemented to be substantially the same as the electronic system described above in connection with FIG. 2. For example, a terminal 501 may be implemented to be substantially the same as the first electronic device 201 of FIG. 2, and an IoT device 502 may be implemented to be substantially the same as the second electronic device 202 of FIG. 2. An authentication server 503 and a server 504 may be implemented to be substantially the same as the authentication server 203 and the server 204 of FIG. 2.

Upon powering on, the IoT device 502 may operate as an access point (AP) during a predetermined time. For example, the IoT device 502 may operate as a Wi-Fi AP (e.g., in a soft AP mode) during a predetermined time. The IoT device 502 may be in an initialized state before powering on.

When the IoT device 502 powers on, the terminal 501 may access the IoT device 502 via a communication module (e.g., the communication module 190 of FIG. 1). For example, the terminal 301 may search for a Wi-Fi AP and access the IoT device 502. In this case, the terminal 501 and the IoT device 502 may form a first communication network using Wi-Fi communication.

When the terminal 501 accesses the IoT device 502, the IoT device 502 may send a request for authentication to the terminal 501 through the first communication network (511). For example, the IoT device 502 may access the authentication server 503 to send a request for authentication on the IoT device 502 to the terminal 501.

The terminal 501 may access the authentication server 503 to request authentication (in operation 513). For example, the terminal 501 may release the first communication network connected with the IoT device 502 and send a request for authentication through the second communication network connected with the authentication server 503.

The terminal 501 may display a screen for entry of authentication information. For example, the terminal 501 may receive the user's login information (e.g., ID and password), as authentication information, through the screen for entry of authentication information displayed on the touchscreen (e.g., the display device 160 of FIG. 1) of the terminal.

Upon receiving the authentication information, the terminal 501 may transmit the authentication information to the authentication server 503 (in operation 517). For example, the terminal 301 may transmit the authentication information through the second communication network to the authentication server 503. Even where the IoT device 502 lacks a display means and an input means, the authentication server 503 may receive the authentication information using the terminal 501.

The authentication server 503 may receive the authentication information through the second communication network. The authentication server 503 may determine whether the received authentication information matches any one of a plurality of pieces of authentication information stored in the authentication server 503. When the received authentication information matches any one of the plurality of pieces of authentication information stored in the authentication server 503, the authentication server 503 may determine that the authentication is complete (or succeeds). By contrast, unless the received authentication information matches any one of the plurality of pieces of authentication information stored in the authentication server 503, the authentication server 503 may determine that the authentication fails.

When the authentication is complete, the authentication server 503 may transmit an authentication code to the terminal 501 (in operation 519). The authentication code may mean data indicating that authentication on the IoT device 502 is complete. Where the authentication fails, the authentication server 503 may transmit a message indicating that the authentication fails to the terminal 501. At this time, the terminal 501 may not obtain the authentication code.

The terminal 501 may transmit the authentication code to the IoT device 502 (521). At this time, the terminal 501 may release the second communication network connected with the authentication server 503 and transmit the authentication code through the first communication network to the IoT device 502. For example, the terminal 501 may connect to the IoT device 502 using the prior access information.

The IoT device 502 may transmit the authentication code to the authentication server 503 (in operation 523). At this time, the IoT device 502 may release the first communication network connected with the terminal 501 and transmit the authentication code to the authentication server 503.

Upon receiving the authentication code, the authentication server 503 may transmit the access token corresponding to the authentication code to the IoT device 502 (525). The access token may mean data indicating an authority to allow the IoT device 502 complete for authentication to access the server 504.

The IoT device 502 may access the server 504 using the access token (in operation 527). Further, the IoT device 502 may be registered in the server 504 using the access token.

Referring to FIG. 5B, the electronic system described above in connection with FIG. 5A may further include a proxy server 505.

The proxy server 505 may function to transfer data necessary for authentication between the terminal 501 and the IoT device. For example, the proxy server 505 may be a server independent from the authentication server 503.

Upon powering on, the IoT device 502 may operate as an access point (AP) during a predetermined time. For example, the IoT device 502 may operate as a Wi-Fi AP (e.g., in a soft AP mode) during a predetermined time. The IoT device 502 may be in an initialized state before powering on.

When the IoT device 502 powers on, the terminal 501 may access the IoT device 502 via a communication module (e.g., the communication module 190 of FIG. 1). For example, the terminal 301 may search for a Wi-Fi AP and access the IoT device 502. In this case, the terminal 501 and the IoT device 502 may form a first communication network using Wi-Fi communication.

When the terminal 501 accesses the IoT device 502, the terminal 501 may transmit first information to the IoT device 502 (in operation 551). In other words, the terminal 501 may transmit the first information to the IoT device 502 through the first communication network. For example, the first information may include information (e.g., the phone number of the terminal 501) related to the terminal 501. The first information may also include information about the Wi-Fi AP. The Wi-Fi AP may mean information about the Wi-Fi AP stored in the terminal 501.

The IoT device 502 may access the Wi-Fi AP using AP information contained in the first information. At this time, the first communication network established between the terminal 501 and the IoT device 502 may be released.

The IoT device 502 may send a request for authentication to the proxy server 505 through the accessed Wi-Fi AP (in operation 553). For example, the IoT device 502 may access the authentication server 503 to send a request for authentication on the IoT device 502 to the proxy server 505.

The proxy server 505 may transmit (or push) the authentication request received from the IoT device to the terminal 501 (in operation 555). For example, the proxy server 505 may transmit the authentication request to the terminal 501 using the phone number contained in the first information.

Subsequent operations 557 to 571 of the terminal 501 and the authentication server 503 may be substantially the same as the operations 513 to 527 of the authentication server 503 and the terminal 501 described above in connection with FIG. 5A except for the operations 565 and 567 of the terminal 501 transmitting the authentication code through the proxy server 505 to the IoT device 502. The operations would readily be implemented by a skilled artisan, and no detailed description thereof is given below.

Figure 6:
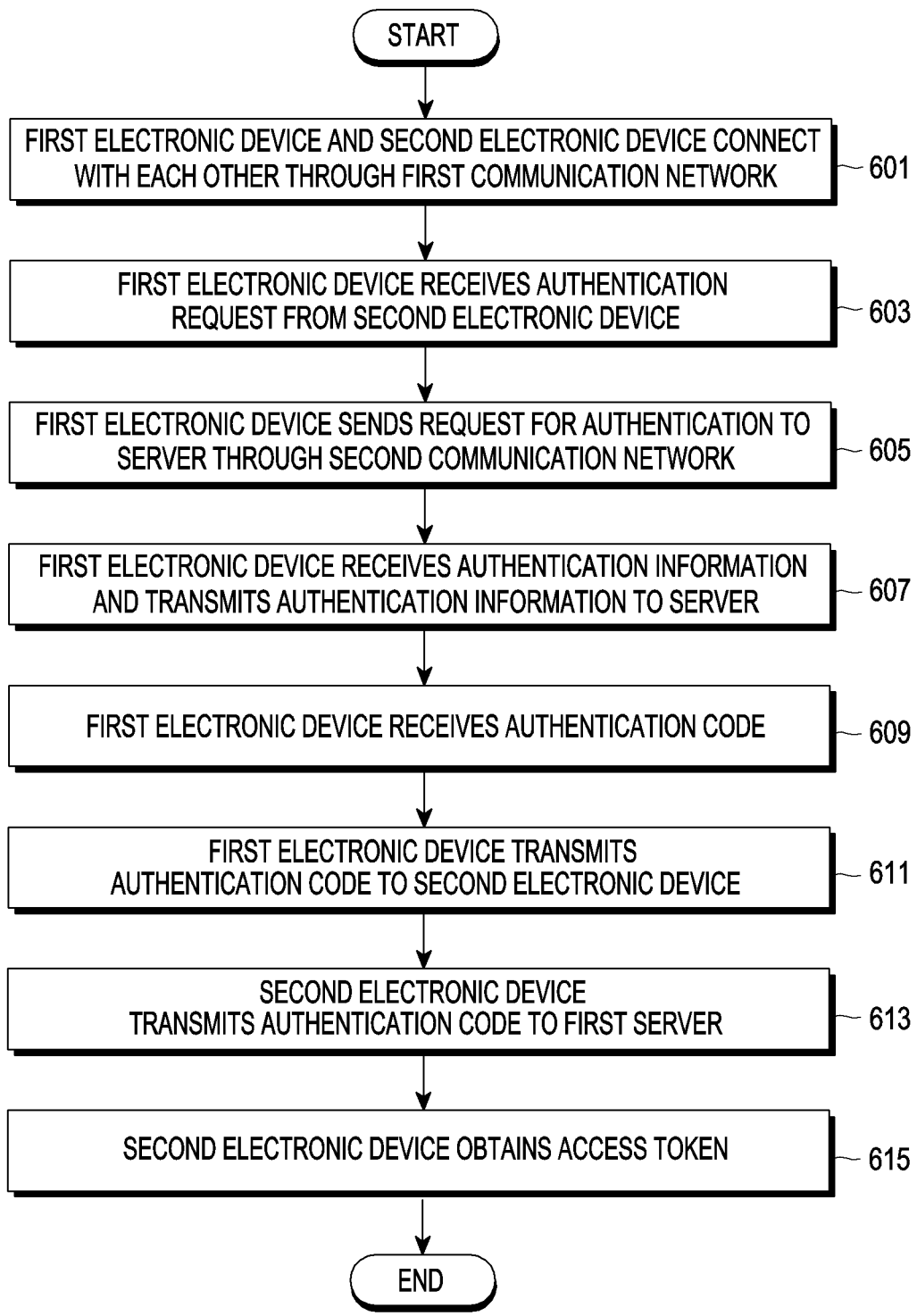
FIG. 6 is a flowchart illustrating operations of a first electronic device according to an embodiment.

FIG. 6 is a flowchart illustrating operations of a first electronic device according to an embodiment.

Referring to FIG. 6, a first electronic device (e.g., the first electronic device 201 of FIG. 2) may connect with a second electronic device (e.g., the second electronic device 202 of FIG. 2) through a first communication network (in operation 601). For example, when the second electronic device 202 powers on, the second electronic device 202 may operate as an AP during a predetermined time. At this time, the first electronic device 201 may access the second electronic device 202 which operates as an AP. At this time, the first communication network may be established between the first electronic device 201 and the second electronic device 202.

The first electronic device 201 may receive an authentication request from the second electronic device 202 through the first communication network (in operation 603).

The first electronic device 201 may send a request for authentication to a first server (e.g., the authentication server 203 of FIG. 2) (in operation 605). For example, the first electronic device 201 may release the first communication network and form a second communication network with the first server 203.

After transmitting the authentication request to the first server 203, the first electronic device 201 may display a screen for entry of authentication information on the touchscreen (e.g., the display device 160 of FIG. 1). The first electronic device 201 may receive the authentication information through the screen capable of entry of authentication information (in operation 607). The first electronic device 201 may transmit the received authentication information to the first server 203 (in operation 607). For example, the authentication information may contain information about the ID and password of the user (e.g., the user of the first electronic device 201) registered in the first server 203.

When the first electronic device 201 transmits the authentication information for authentication on the second electronic device 202 to the first server, the first server 203 may perform authentication on the second electronic device 202 using the received authentication information.

When the authentication is complete by the first server 203, the first electronic device 201 may receive an authentication code from the first server 203 (in operation 609). The authentication code may mean data indicating that authentication on the IoT device 202 is complete.

The first electronic device 201 may transmit the authentication code to the second electronic device 202 (in operation 611). For example, the first electronic device 201 may directly transmit the authentication code to the second electronic device 202. The first electronic device 201 may transmit the authentication code to the second electronic device 202 through a proxy server (e.g., the proxy server 505 of FIG. 5B).

The second electronic device 202 may receive the authentication code and transmit the received authentication code to the first server 203 (in operation 613). For example, the second electronic device 202 may connect to the first electronic device 201 to receive the authentication code using the information about prior access to the first electronic device 201. The second electronic device 202 may release the connection with the first electronic device 201 and connect to the first server 203 to transmit the authentication code.

The second electronic device 202 may obtain an access token corresponding to the authentication code from the first server 203 (in operation 615). The second electronic device 202 may access a second server (e.g., the server 204 of FIG. 2) using the access token. Further, the second electronic device 202 may be registered in the second server 204 using the access token.

FIGS. 7A, 7B, 7C, and 7D are views illustrating a user interface where a first electronic device performs authentication on a second electronic device according to an embodiment.

Referring to FIGS. 7A to 7D, a terminal (e.g., the terminal 301 of FIG. 3) may display a user interface for authenticating an IoT device (e.g., the IoT device 302 of FIG. 3) through a touchscreen (e.g., the display device 160 of FIG. 1).

Figures 7A, 7B:
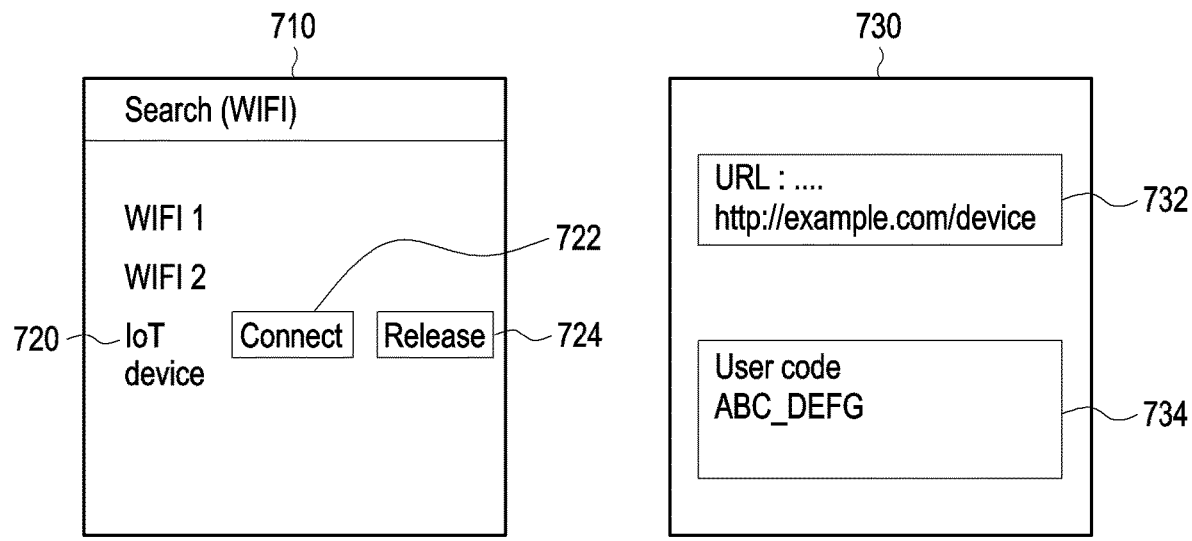
FIGS. 7A, 7B, 7C, and 7D are views illustrating a user interface where a first electronic device performs authentication of a second electronic device according to an embodiment.

Referring to FIG. 7A, the terminal 301 may display a first user interface 710 to connect with the IoT device 302.

The terminal 301 may search for a Wi-Fi AP and connect to the IoT device 302. For example, upon powering on, the IoT device 302 may be operated as a Wi-Fi AP during a predetermined time. At this time, the terminal 301 may search for a plurality of Wi-Fi APs and select the IoT device 302 among the plurality of APs. When the IoT device 302 is selected from among the plurality of APs, the terminal 301 may connect to the IoT device 302.

The first user interface 710 may display the plurality of APs that the terminal 301 has searched for. The first user interface 710 may display information about information 720 about the IoT device searched for. Upon receiving an input of a first icon 722 to connect with the IoT device, the terminal 301 may connect to the IoT device 302. Upon receiving an input of a second icon 724 to release the connection with the IoT device, the terminal 301 may release the connection with the IoT device 302.

Figures 7C, 7D:
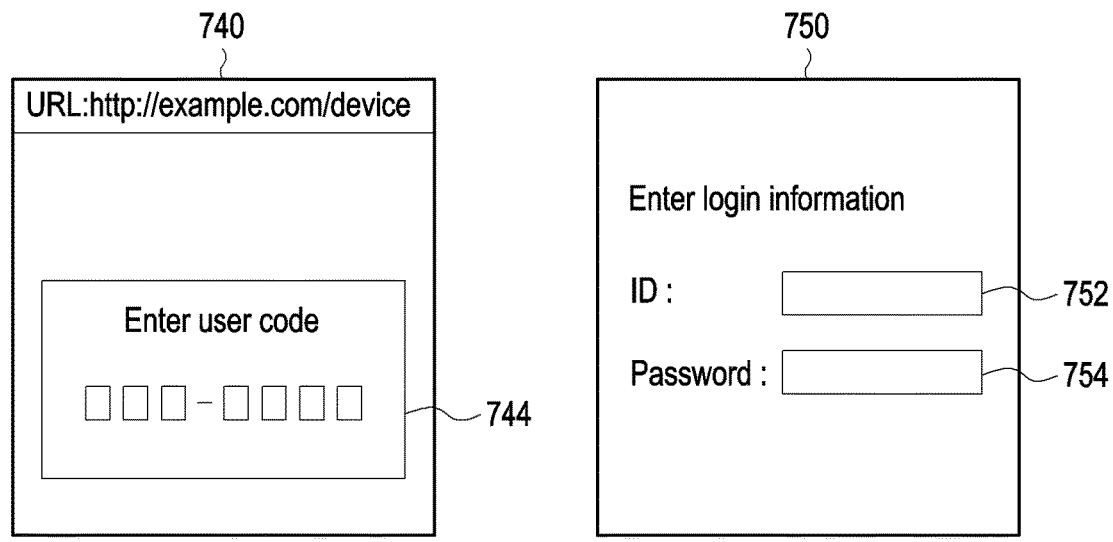

Referring to FIGS. 7B and 7C, the terminal 301 may display a second user interface 730 including a first screen to authenticate the IoT device 302.

When an authentication server (e.g., the authentication server 303 of FIG. 2) receives a request for authentication on the IoT device 302, the terminal 301 may receive second information (e.g., URL address and user code) for authentication from the authentication server (e.g., the authentication server 303 of FIG. 3). Further, the terminal 301 may display a first screen including the URL address and the user code.

Referring to FIG. 7B, the second user interface 730 may display information 734 about the user code and information 732 about the URL address received from the authentication server 303.

The information 732 about the URL address may display the URL address received from the authentication server

303. Further, the information 732 about the URL address may display a message indicating that access to the URL address is necessary using a browser.

The information 734 about the user code may display the user code received from the authentication server 303. The information 734 about the user code 734 may display the message indicating that access to the URL address and entry of the user code are necessary.

Referring to FIG. 7C, the terminal 301 may display a third user interface 740 including a screen that the user accesses the URL address using the browser.

The third user interface 740 may display a user code input window 744 to receive the user code. The terminal 301 may receive the user code displayed on the second user interface 730 through the user code input window 744. At this time, the user needs to enter the same code as the user code displayed on the second user interface 730 on the user code input window 744. For example, the terminal 301 may receive 'ABC-DEFG' displayed on the information about user code through the user code input window 744 by the user. The terminal 301 may transmit 'ABC-DEFG' entered to the user code input window 744 to the authentication server 303.

Referring to FIG. 7D, the terminal 301 may display a fourth user interface 750 to display the second screen for entry of authentication information.

When the same code as the user code displayed on the second user interface 730 is entered to the user code input window 744, the terminal 301 may display the second screen to receive authentication information. Further, the terminal 301 may receive the authentication information through the second screen. For example, the authentication information may include information about the ID and password by which the authentication server 303 may identify the user or terminal 301.

The fourth user interface 750 may display an ID input window 752 and a password input window 754 to receive the user's authentication information. The terminal 301 may receive an ID registered in the authentication server 303 through the ID input window 752 and a password for the ID through the password input window 754. The terminal 301 may transmit the ID and password entered to the ID input window 752 and the password input window 754 to the authentication server 303.

Figure 8A:
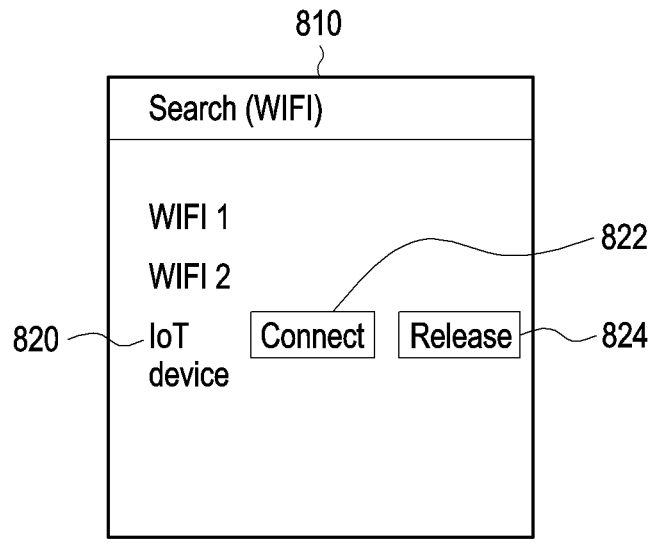
FIGS. 8A and 8B are views illustrating a user interface where a first electronic device performs authentication of a second electronic device according to an embodiment.
Figure 8B:
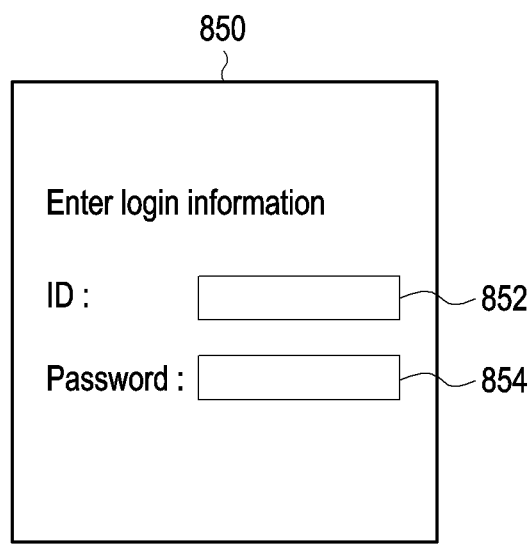

FIGS. 8A and 8B are views illustrating a user interface where a first electronic device performs authentication on a second electronic device according to an embodiment.

Referring to FIGS. 8A and 8B, a terminal (e.g., the terminal 501 of FIG. 5) may display a user interface for authenticating an IoT device (e.g., the IoT device 502 of FIG. 5) through a touchscreen (e.g., the display device 160 of FIG. 1).

The terminal 501 may search for a Wi-Fi AP and connect to the IoT device 502. For example, upon powering on, the IoT device 502 may be operated as a Wi-Fi AP during a predetermined time. At this time, the terminal 501 may search for a plurality of Wi-Fi APs and select the IoT device 502 among the plurality of APs. When the IoT device 502 is selected from among the plurality of APs, the terminal 501 may connect to the IoT device 502.

The first user interface 810 may display the plurality of APs that the terminal 501 has searched for. The first user interface 810 may display information about information 820 about the IoT device searched for. Upon receiving an input of a first icon 822 to connect with the IoT device, the terminal 501 may connect to the IoT device 502. Upon receiving an input of a second icon 824 to release the connection with the IoT device, the terminal 501 may release the connection with the IoT device 502.

Referring to FIG. 8B, the terminal 501 may display a second user interface 850 to display the screen for entry of authentication information.

When the authentication request is transmitted to the authentication server (e.g., the authentication server 503 of FIG. 5), the terminal 501 may display a screen for receiving the authentication information. Further, the terminal 501 may receive the authentication information through the screen. For example, the authentication information may include information about the ID and password by which the authentication server 503 may identify the user or terminal 501.

The second user interface 850 may display an ID input window 852 and a password input window 854 to receive the user's authentication information. The terminal 501 may receive an ID registered in the authentication server 503 through the ID input window 852 and a password for the ID through the password input window 854. The terminal 501 may transmit the ID and password entered to the ID input window 852 and the password input window 854 to the authentication server 503.

According to an embodiment, a first electronic device comprises a touchscreen and a processor configured to transmit first information related to the first electronic device or a user account of the first electronic device through a first communication network to authenticate a second electronic device, obtain second information to authenticate the second electronic device transmitted from the first server based on the first information through a second communication network, wherein an authentication request including the first information is transmitted from the second electronic device to a first server configured to support an authentication function, display a first screen for the second information on the touch screen to receive a first input related to the second information, receive authentication information through the touch screen when the first input is received through the first screen, and transmit the authentication information to the first server to authenticate the second electronic device.

The second electronic device may be an internet of things (IoT) device lacking an input device and a display.

The authentication information may correspond to an access token to allow the second electronic device to access a second server.

The first screen may include a designated URL address and a user code.

The processor may be configured to display the second screen to receive the authentication information upon accessing the URL address through the first screen and receiving the user code.

The first information may include at least one of a user's email address and a phone number of the first electronic device.

The first communication network may be formed between the first electronic device and the second electronic device using the second electronic device as an access point (AP).

The processor may be configured to access the first server through the second communication network after releasing the first communication network.

According to an embodiment, a method for operating a first electronic device comprises transmitting first information related to the first electronic device or a user account of the first electronic device through a first communication network to authenticate a second electronic device, obtaining second information to authenticate the second electronic device transmitted from a first server based on the first information through a second communication network, wherein an authentication request including the first information is transmitted from the second electronic device to a first server configured to support an authentication function, displaying a first screen for the second information on a touchscreen of the first electronic device to receive a first input related to the second information, receiving authentication information through the touchscreen when the first input is received through the first screen, and transmitting the authentication information to the first server to authenticate the second electronic device.

The second electronic device may be an internet of things (IoT) device lacking an input device and a display.

The authentication information may correspond to an access token to allow the second electronic device to access a second server.

The first screen may include a URL address and a user code.

The method may further comprise displaying the second screen to receive the authentication information upon accessing the URL address through the first screen and receiving the user code.

The first information may include the user's email address or a phone number of the first electronic device.

The method may further comprise forming the first communication network between the first electronic device and the second electronic device using the second electronic device as an AP.

The method may further comprise accessing the first server through the second communication network after releasing the first communication network.

According to an embodiment, a first electronic device comprises a touchscreen and a processor configured to, upon receiving an authentication request from a second electronic device through a first communication network, display a first screen to receive authentication information on the touch screen, receive the authentication information through the first screen through a second communication network, transmit the received authentication information to a first server configured to support authentication on the second electronic device, receive an authentication code from the first server, and transmit the received authentication code to the second electronic device.

The second electronic device may be an internet of things (IoT) device lacking an input device and a display.

The authentication code may correspond to an access token to allow the second electronic device to access a second server.

The processor may be configured to receive the authentication request through a proxy server and transmit the authentication code through the proxy server.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

As is apparent from the foregoing description, according to various embodiments, an electronic device may perform Outh-based authentication on an IoT device lacking a display and an input device, allowing for authentication on the IoT device that has limitations in display and entry.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. A first electronic device, comprising:
   a communicator;
   a touchscreen; and
   a processor configured to:
   control the communicator to transmit first information related to at least one of the first electronic device and a user account of the first electronic device through a first communication network to authenticate a second electronic device,
   obtain second information to authenticate the second electronic device transmitted from a first server based on the first information through a second communication network, wherein an authentication request is made and comprises the first information being transmitted from the second electronic device to the first server configured to support an authentication function,
   control the touchscreen to display a first screen requesting first input related to the second information,
   receive authentication information based on the first input, and
   control the communicator to transmit the authentication information to the first server to authenticate the second electronic device,
   wherein the second electronic device is an internet of things (IoT) device lacking an input device and a display.

2. The first electronic device of claim 1, wherein the authentication information corresponds to an access token for the second electronic device to access a second server.

3. The first electronic device of claim 1, wherein the first screen comprises a uniform resource locator (URL) address and a user code.

4. The first electronic device of claim 3, wherein the processor is further configured to control the touchscreen to display a second screen to receive the authentication information based on accessing the URL address through the first screen and receiving the user code.

5. The first electronic device of claim 1, wherein the first information comprises at least one of an email address of a user and a phone number of the first electronic device.

6. The first electronic device of claim 1, wherein the first communication network is formed between the first electronic device and the second electronic device using the second electronic device as an access point (AP).

7. The first electronic device of claim 1, wherein the processor is configured to access the first server through the second communication network after releasing the first communication network.

8. A method of operating a first electronic device, the method comprising:
   transmitting first information related to at least one of the first electronic device and a user account of the first electronic device through a first communication network to authenticate a second electronic device;
   obtaining second information to authenticate the second electronic device transmitted from a first server based on the first information through a second communication network, wherein an authentication request is made and comprises the first information being transmitted from the second electronic device to the first server configured to support an authentication function;

displaying, on a touchscreen of the first electronic device, a first screen requesting first input related to the second information;
receiving authentication information based on the first input; and
transmitting the authentication information to the first server to authenticate the second electronic device,
wherein the second electronic device is an internet of things (IoT) device lacking an input device and a display and the authentication information is received via the touchscreen, which displays the first screen.

9. The method of claim 8, wherein the authentication information corresponds to an access token for the second electronic device to access a second server.

10. The method of claim 8, wherein the first screen comprises an URL address and a user code.

11. The method of claim 10, further comprising: displaying, the touchscreen, a second screen to receive the authentication information based on accessing the URL address through the first screen and receiving the user code.

12. The method of claim 8, wherein the first information comprises at least one of an email address of a user and a phone number of the first electronic device.

13. The method of claim 8, further comprising:
forming the first communication network between the first electronic device and the second electronic device using the second electronic device as an AP.

14. The method of claim 8, further comprising:
accessing the first server through the second communication network after releasing the first communication network.

15. A non-transitory computer-readable recording medium capable of storing a program for performing operations of a first electronic device, the operations comprising:
transmitting first information related to at least one of the first electronic device and a user account of the first electronic device through a first communication network to authenticate a second electronic device;
obtaining second information to authenticate the second electronic device transmitted from a first server based on the first information through a second communication network, wherein an authentication request is made and comprises the first information being transmitted from the second electronic device to the first server configured to support an authentication function;
displaying, on a touchscreen of the first electronic device, a first screen requesting first input related to the second information;
receiving authentication information based on the first input; and
transmitting the authentication information to the first server to authenticate the second electronic device,
wherein the second electronic device is an internet of things (IoT) device lacking an input device and a display and the authentication information is received via the touchscreen, which displays the first screen.

16. The non-transitory computer-readable recording medium of claim 15, wherein the authentication code corresponds to an access token for the second electronic device to access a second server.

17. The non-transitory computer-readable recording medium of claim 15, wherein the operations further comprises receiving the authentication request through a proxy server and transmitting the authentication code through the proxy server.

* * * * *